//# 2,890,961

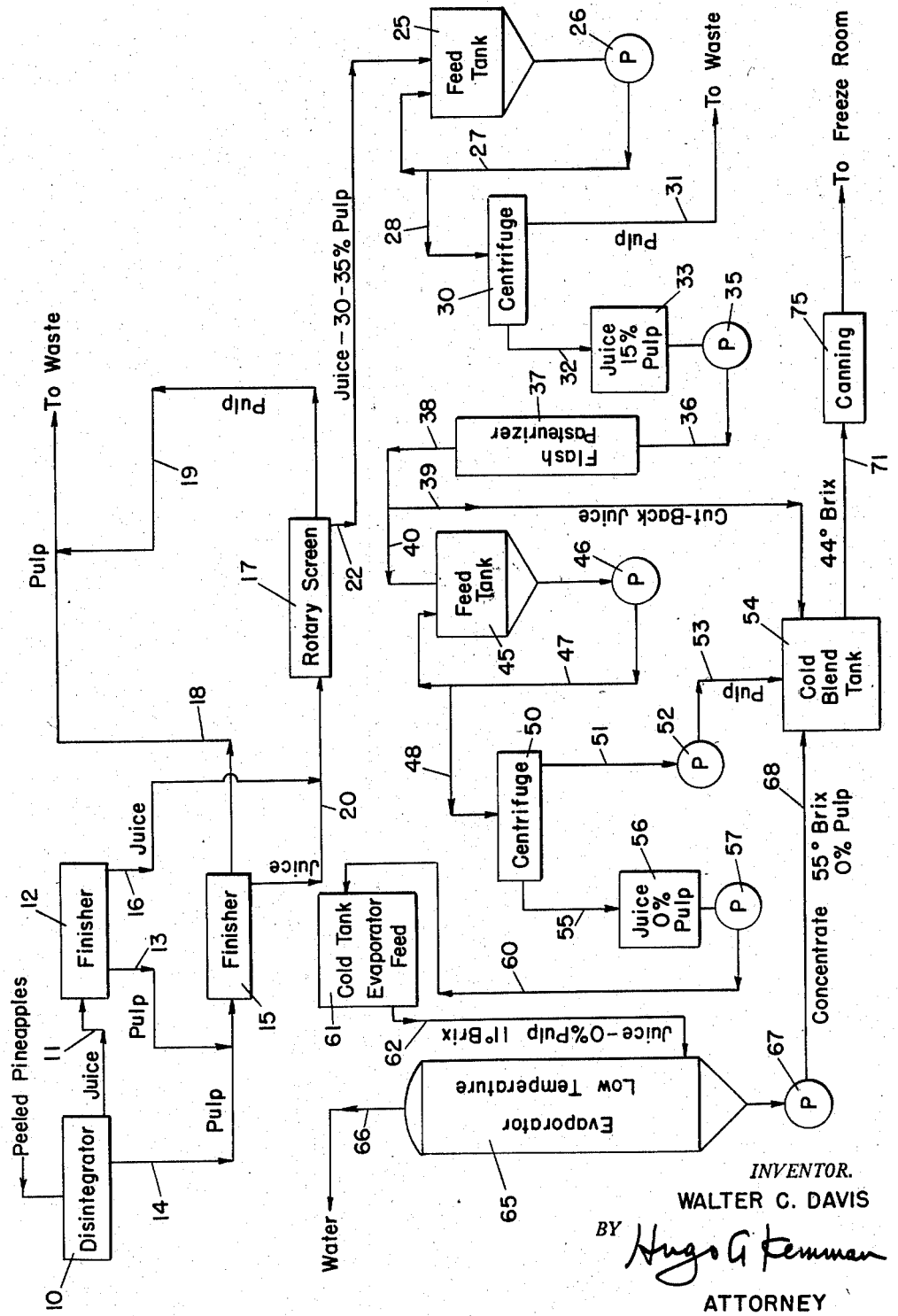

FOOD PRODUCTS

Walter C. Davis, Tredyffrin Township, Chester County, Pa., assignor to The Sharples Corporation, a corporation of Delaware Application August 4, 1951, Serial No. 240,323

6 Claims. (Cl. 99—205)

This invention relates to a process and apparatus for concentrating food juices. More specifically, the invention relates to processing either juices, slurries or purees of vegetables and fruits, such as pineapple, tomatoes, ketchup, consomme, apples, grapes, prunes, apricots, peaches, citrus fruits, jelly stocks and the like, so as to preserve the original taste and flavor.

Previous methods for concentrating and preserving food juices for canning or quick freezing have not been entirely successful because in the preparation of the final juices the aroma and flavors have been largely lost so that the final product has an insipid or very poor taste compared with the original fresh juice. I have discovered that the flavor losses are caused not only on account of loss of volatile esters or other organic flavor bodies on account of too high temperatures used during concentration of the fresh juices, but also on account of removal of certain solids present in the fresh juices which carry the flavor and aroma bodies characterizing the fresh juices. These solids also often carry color bodies which are found in the fresh juices but upon removal cause a marked change in the appearance of the concentrated juices. In prior methods for preparing concentrated food juices it is usual to separate the undesirable solid materials such as fibrous substances, seeds, dirt and the like, suspended in the juice prior to concentrating same, but in separating these materials desirable solid materials carrying the flavor components of the fresh juice are also removed so that as a result the concentrated juice does not have the same flavor or aroma of the fresh juice.

The present invention provides a successful method and means for overcoming the difficulties previously encountered in producing concentrated juices suitable for subsequent canning or freezing which retain the original taste, flavor and aroma of the fresh juices. The invention can be illustrated by reference to the production of concentrated pineapple juice which has been particularly unsatisfactory in the past on account of the marked inferior flavor due to loss of the desirable flavor components during concentrating procedures previously practiced.

For many years, pineapple juice has been extracted from miscellaneous cuts of pineapples, processed by conventional sterilization and pasteurization techniques, and canned. Citrus juices have been similarly processed. In order to impart good keeping quality to the product, it has been necessary to heat these juices to temperatures sufficiently high to kill bacteria and to denature proteinaceous materials. Heating to 190° F. causes the loss of a major portion of the volatile esters which account for the natural fruit flavors. In the case of citrus juices, little market was found for canned juices because of the poor comparative flavor and the easy accessibility of fresh fruit.

During recent years considerable progress has been made in the citrus industry due to the development of low temperature evaporative concentration processes. By use of such processes, fresh orange juice, for example, is boiled at temperatures below 80° F. and concentrated into about ⅙ its original volume. One volume of fresh juice is usually added to the concentrate, after which this mixture is frozen and kept in a frozen state until the can is opened for use.

Attempts have also been made to prevent impairment of flavor due to loss of volatile esters and other flavor imparting components in fresh juices by concentrating the juices at low temperatures under vacuum. Fresh juices have also been added in certain proportions to the concentrated juice to produce a frozen concentrate which when reconstituted with water would approach the flavor, texture and body of the fresh juice. Such procedures, however, have not been very successful with such juices as concentrated pineapple juice which failed to preserve the desirable original flavor of the fresh juice.

In order to release mechanically bound juice and flavor bodies from pineapple, it is necessary to grind or pulverize the fruit to a rather great extent. Various types of commercially available disintegrators and attrition mills are used, but in most cases it is necessary to grind to a particle size of less than .015" in order to thoroughly release the juice. A pineapple when completely ground will measure approximately 70% pulp by volume as measured in a slow speed bottle centrifuge. The pulp consists of three distinct phases, the proportions of which will vary considerably depending upon the type of fruit and its degree of ripeness and also upon the extent of the pulverization during the grinding operation. Generally speaking, however, the pulp consists of coarse stringy fibres, fine albuminous particles and a wide cross section of materials which may be called impurities. These impurities usually consist of dirt, sand, bug fragments (especially from fruit flies), specks (the dark pieces of the deeply imbedded pineapple eyes) and other foreign material. Esters, which are largely responsible for flavor, are closely associated with the albumin; both, along with the juices, being mechanically bound by the pineapple fibers.

From the foregoing, it follows that pineapple juice expressed from the fruit absent the release of the albumin and attendant esters will have little or no flavor. Such juice also has little body or texture. It follows that simple pressing of pineapples is not feasible and fine milling, as heretofore discussed, is required. Following milling I have found that a precise fractionation of the pulp content of the juice is required in order to produce a satisfactory juice containing the desired albumin fraction.

As previously explained, citrus juice concentration is carried out in low temperature evaporators. Raw citrus juice, averaging 10° to 11° Brix is concentrated to 55° Brix in this manner. Orange juice concentrate at 55° Brix is relatively fluid and quite pumpable. No extreme change apparently occurs in the viscosity of the concentrate during evaporation. This relative ease of concentration of orange juice is no doubt materially due to the absence of insoluble solids in the fresh juice. Ordinary citrus dejuicers do not put a large amount of pulp into the juice and that which is entrained can easily be removed down to a rather low level by conventional finisher screens. However, in cases where insoluble solids occur in the fresh juice difficulty is always encountered due to high viscosity of the concentrate in the range of 50°–55° Brix. The problems attending the concentration of pineapple juice are much greater than in the case of citrus juices. It has been found that evaporation, in conventional low temperature evaporators, cannot be carried beyond 42°–45° Brix where the presence of albuminous solids exists to the extent of as little as 5% of the fresh juice as measured by a slow speed (1500 r.p.m. x 11" diam. for 2 minutes) bottle centrifuge. At the 5% level, jelling of the concentrate occurs at 42–45° Brix to the extent that heat transfer and circulation within the evaporator is impaired to such a degree that further concentration is prohibited. I have discovered that the complete removal of all pulp from the pineapple juice, prior to evaporation, allows excellent heat transfer and circulation so that the juice can be concentrated to as high as 60° Brix and still remain fluid and pumpable. Concentration of the pineapple juice according to my invention to 60° Brix allows the introduction of cut-back juice at a high ratio, after which the separated fine albuminous pulp can be reblended with the concentrate, thus giving a finished concentrate having a high degree of natural fruit flavor, good body and good texture. U.S. Department of Agriculture regulations for ordinary canned pineapple juice indicate that the desirable range of pulp content in finished pineapple juice is 14–20% by volume as measured by the bottle centrifuge test. By suitable centrifugal classification of disintegrated pineapple, coarse fibers, coarse pulp and foreign material can be substantially removed. The effluent juice containing the flavorful albuminous pulp can then be centrifugally freed of all pulp whereupon it can be properly concentrated. Thus a finished concentrate, which when reconstituted with water for use, can be made to contain all of the desirable constituents while eliminating the undesirable, also making the evaporator operation practical for high level concentration.

Further details of my invention for producing concentrated pineapple juice will be apparent from the following description with reference to the accompanying diagrammatic drawing illustrating a suitable form of apparatus for carrying out my process.

Referring to the drawing, the peeled pineapples are fed to a disintegrator or attrition mill 10 of any suitable conventional construction which grinds the pineapple to a suitable particle size in order to release the juice. The juice is fed by line 11 to a finisher 12 which removes the solids particles over .023" by suitable screens. The pulp from the disintegrator 10 and finisher 12 is fed by lines 14 and 13, respectively, to a finisher screen 15 which removes particles over .023" by suitable screens. The waste pulp is discarded through line 18. The juice from the finishers 12 and 15 is fed by lines 16 and 20, respectively, to a rotary screen 17 which is provided with .015" holes to provide juice containing 30–35% pulp of a particle size not larger than .015" containing the albuminous flavor-bearing components. The pulp from rotary screen 17 is discarded through line 19.

The juice supplied by rotary screen 17 is fed by line 22 to a feed tank 25 which is connected to a pump 26 adapted, if desired, to recirculate the juice in feed tank 25 through line 27 provided with suitable valve controls and also to feed the juice by line 28 to a centrifuge 30. The pulp separated in centrifuge 30 is discarded through line 31. The juice coming from centrifuge 30 contains about 15% by volume pulp. This pulp content may be controlled at slightly higher or lower levels if desired.

The centrifuge 30 is of a type which permits continuous selective centrifugal separation or classification of solids. Such centrifuge permits the separation of the coarse fibers and pulp and foreign materials from the albuminous pulp carrying the desirable flavoring agents which are discharged with the juice. A suitable centrifuge to accomplish this selective classification is described in "Design News," October 1950, and is also disclosed in Fitzsimmons Patent 2,286,354, June 16, 1942, and Ayres Patent 2,321,887, June 15, 1943. The centrifuge functions essentially as a clarifier. It may be a high speed disc-type continuous centrifuge that can develop a centrifugal force equal to 9600 times the force of gravity, to separate solids from a liquid. Those solids which are to be completely separated from the juice and discarded accumulate in the outer periphery of the bowl and are periodically removed through a plurality of controlled discharge valves spaced around the inside of the bowl. The consistency of the discharge can be maintained at a predetermined value so that only the heavier waste solids are removed as a sludge while albuminous solids are retained in the bowl and flow out with the clarified juice. The waste pulp may be discarded or used for processing into cattle food. The centrifuge may also be controlled so as to completely remove all solids in the liquor fed to the bowl rather than to remove only a portion of the classified solids.

In place of the type of centrifuge previously referred to provided with valves for removing the classified solids, I may use an ordinary centrifuge and feed the juice to the centrifuge at such rate as will permit the fine flavor-bearing solids and juice to be separated from the foreign solids retained in the bowl. Any other means for classifying and separating the solids in the juices may be used.

The clarified juice from centrifuge 30 is fed by line 32 to a reservoir 33 and now contains about 15% pulp. This pulp content may be controlled at a higher or lower content if desired. The juice is fed by pump 35 through line 36 to a flash pasteurizer 37 which heats the juice quickly to 190° F. and then immediately cools it to about 80° F. within a period of about one minute. The pasteurization step may be omitted if the condition or kind of juice being processed does not require this treatment. Citrus juices usually do not require pasteurization. In the case of pineapple juice the care of selection and handling of the pineapple will determine whether or not pasteurization is necessary. Heating the juice causes some coagulation of fine albuminous particles which may be removed at a subsequent stage.

The juice from the pasteurizer 37 is fed through line 40 to a feed tank 45. The juice in tank 45 may be recirculated therein if desired by pump 46 and line 47 provided with suitable control valves. The juice is fed through line 48 to a second centrifuge 50 which may be similar in construction to centrifuge 30 and which is adjusted for continuous operation to remove all the remaining pulp or desirable solids in the juice which consist largely of albumin. A conventional centrifuge may be used in place of the valve type centrifuge. All the pulp or a predetermined amount of pulp from the centrifuge 50 is pumped through line 51 by pump 52 and through line 53 provided with suitable control valves to a cold blend tank 54.

The temperature in tank 54 is maintained at about 32 to 35° F. The juice effluent from centrifuge 50, containing no substantial amount of pulp, flows through line 55 to a reservoir 56 and is fed by pump 57 through line 60 to a cold tank 61 where it is deaerated and kept at a temperature of about 40–60° F. The juice from tank 61 having substantially no desirable solids or pulp content and of a concentration of about 11° Brix is fed through line 62 to a suitable low temperature evaporator 65 operating at temperatures approximately 80° F. under vacuum until the concentrated juice reaches a level of about 55° Brix. The evaporated water is removed from the evaporator through line 66. The concentration of the juice may be five to one, for example, although this ratio may vary depending upon the nature of the juice being processed. Fresh pineapple juice normally measures 8° to 12° Brix, averaging about 10° Brix.

After the juice has been concentrated to about 55° Brix, the concentrate is fed through line 68 to cold blend tank 54 maintained at a temperature of about 32° F. where fresh unconcentrated cut-back juice is added. The cut-back juice is supplied from the flash pasteurizer by line 39 provided with suitable control valves. A controlled amount of cut-back juice is added so as to dilute the entire mixture to about 44° Brix. The blended concentrate is fed by line 71 to a canning station 75 and the canned juice is then frozen.

It is to be understood that the invention is not restricted to the specific sequence of steps described in connection with the production of concentrated pineapple juice. For example, it may be advantageous in processing certain food slurries to simultaneously separate and classify all desirable and undersirable solids by suitable equipment, or to separate all the solids and then classify the desirable and undesirable solids in any suitable manner and retain the desirable solids for subsequent addition to the concentrated clarified juice. In those instances where the food slurry contains desirable solids of a greater density than the undesirable solids, the slurry can be treated to first separate the desirable solids which are retained for subsequent adding to the concentrated juice, and the undesirable solids are separated at a later stage prior to concentrating the clarified juice. In other words, an important feature of the invention resides in separating and classifying the desirable and undesirable solids and evaporating the juice after all the solids have been removed.

The invention is also very advantageous in processing citrus fruit juices such as orange juice. In the dejuicing or extraction of juice from the orange, the fruit is ruptured or partially ruptured to the extent that a portion of the albedo (white material inside of peel) enters the juice. Most of the pectin content of the citrus fruit is in the albedo, with only small portions of pectin finding their way into the juice from such sources as seeds and partition membranes. It has been determined that the albedo, and therefore the pectin, is largely responsible for gelation in the evaporator and, if not encountered in the evaporator, often occurs later in the container. This is an undesirable condition which affects the quality of the concentrate.

I have found that albedo possesses a slightly greater specific gravity than the fruit cells and the fruit albumins, and therefore can be centrifugally fractionated away from the desirable portion of the citrus juice. For example, extracted orange juice which had been passed through a 40 mesh screen was placed in a high speed bottle centrifuge and spun for two minutes. Total solids amounted to 10% by volume. A definite line of demarcation occurred between albedo in the bottom of the tube and the fruit cells and albumin in the top of the tube. About 50% of the total insoluble solids were in the albedo fraction. The amount of albedo in any given juice will vary considerably depending upon the type and ripeness of fruit and upon the type of juice extractor employed. By centrifuging citrus juice to remove albedo, reduction in bacteria count of the juice will also occur. Any small reduction in bacteria count is of utmost importance since top levels of bacteria are controlled by law. This is especially important in view of the fact that in low temperature concentration of citrus juices, no sterilization or pasteurization is normally carried out. Accordingly my invention may be very advantageously utilized for concentrating citrus juices by first dejuicing the fresh fruit and separating same from the rind and coarse solids. The juice is then subjected to selective classification to remove the albedo and other undesirable solids while retaining the desirable solids. The juice containing the desirable solids may then be concentrated to a desired consistency, or if desired, as an alternative procedure the juice may be centrifuged to remove substantially all the desirable solids and the clarified juice is then suitably concentrated at a low temperature under vacuum to a desired concentration. The previously separated desirable solids are then added in predetermined amount to the concentrated juice, and if desired, a predetermined amount of unconcentrated cut-back clarified juice may also be added to produce a final product of desired consistency and concentration.

It will be evident from the foregoing description that the present invention is particularly suitable for producing concentrated pineapple juice and other fruit juices wherein the flavor of the fresh juice is retained. The process is particularly effective for producing concentrated juices of fruits having delicate flavors which are sensitive to heat and which are lost when undesirable solids are separated from the fresh fruit slurry. As previously stated, the process and apparatus herein described in connection with producing concentrated pineapple juice is adapted for processing juices, slurries and purees of vegetables and fruits, such as apricots, peaches, citrus fruits, prunes, grapes, apples, tomatoes, ketchup, consomme, jelly stocks and the like, so as to retain the original flavor and taste.

Modifications and changes may be made in the specific steps of the process as previously indicated, and other equivalent means may be used for those specifically described in carrying out the procedures herein described, all of which are intended to be included within the scope of the appended claims.

For convenience in the claims, the term "vegetable" is used in its broader sense to include what is commonly known as fruit.

I claim:

1. In a process for the manufacture of a food product from an edible vegetable which contains albuminous solids and solids of density different from that of said albuminous solids wherein a slurry of juice and finely divided pulp including both of said solids is produced from said vegetable, and wherein said slurry is treated to produce a concentrated product which includes a portion of said finely divided pulp, the steps of centrifugally separating said pulp into fractions which differ from each other as to density, one of said fractions consisting predominantly of said albuminous solids, and another of said fractions consisting predominantly of solids other than albuminous solids, discarding said last-mentioned fraction, and treating said juice to concentrate the same by evaporation and to incorporate therein said fraction consisting predominantly of said albuminous solids.

2. A process as defined in claim 1 wherein a pulp fraction of greater density is first separated from the slurry, and wherein a pulp fraction of lesser density is thereafter separated from said slurry and prior to the concentration of said juice.

3. A process as defined in claim 2 wherein the slurry is produced from fruit, and wherein the pulp fraction of lesser density and consisting predominantly of albuminous solids is added to the concentrated juice.

4. A process as defined in claim 3 wherein the fruit is pineapple.

5. A process as defined in claim 3 wherein the fruit is citrus fruit.

6. A process as defined in claim 3 wherein the citrus fruit is oranges.

References Cited in the file of this patent

UNITED STATES PATENTS

| | | |
|---|---|---|
| 1,189,127 | Kellogg | June 27, 1916 |
| 1,295,943 | Welch | Mar. 4, 1919 |
| 2,091,606 | Murray | Aug. 31, 1937 |
| 2,115,815 | Johnson | May 3, 1938 |
| 2,286,354 | Fitzsimmons | June 16, 1942 |
| 2,374,456 | Ravndal et al. | Apr. 24, 1945 |
| 2,549,575 | Conley | Apr. 17, 1951 |
| 2,558,799 | Thomas | July 3, 1951 |
| 2,696,440 | Ball | Dec. 7, 1954 |